Dec. 4, 1945.    M. A. EDWARDS    2,390,084
REGULATING APPARATUS
Filed March 25, 1944    2 Sheets-Sheet 1
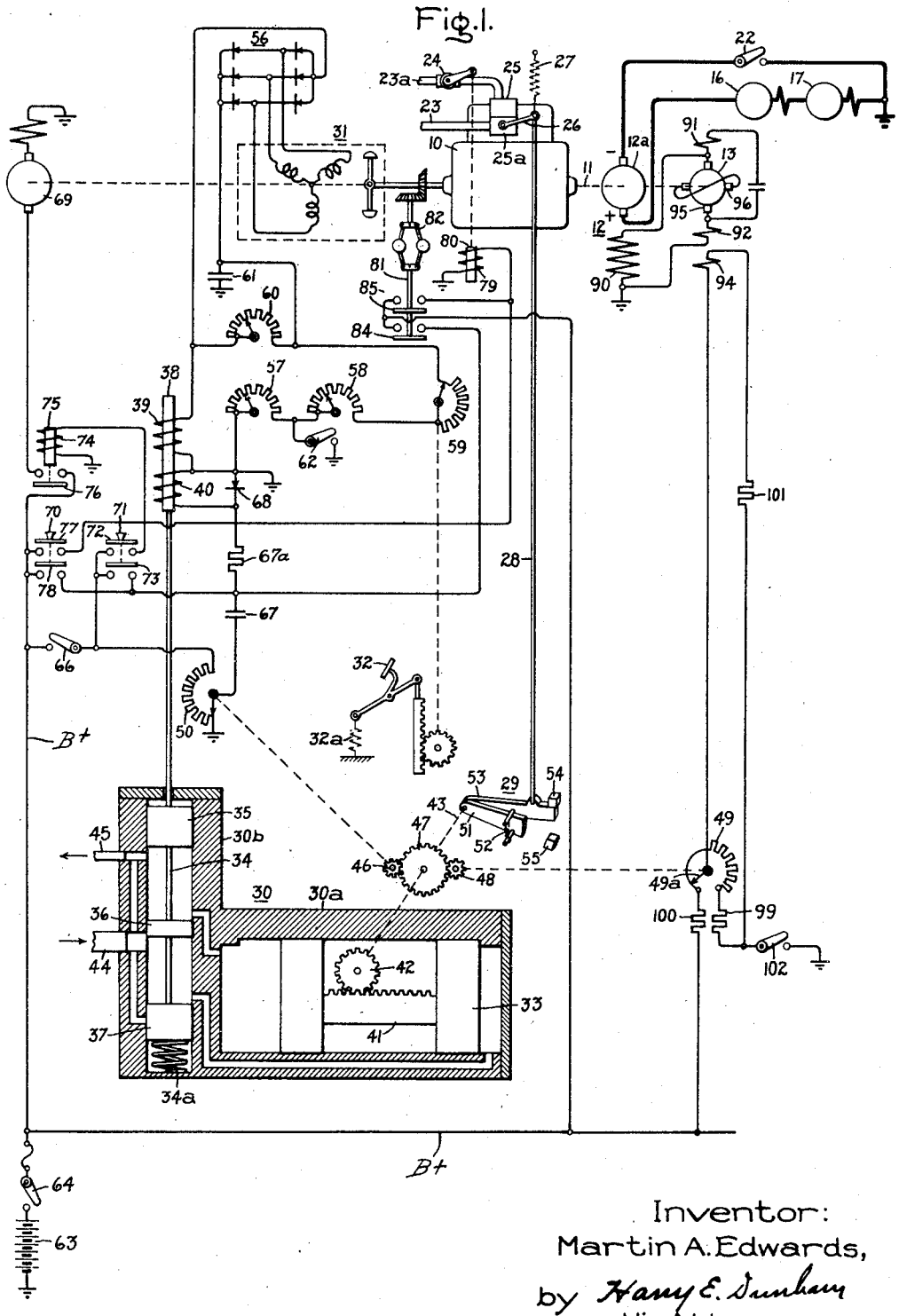
Inventor:
Martin A. Edwards,
by Harry E. Dunham
His Attorney.

Dec. 4, 1945.  M. A. EDWARDS  2,390,084
REGULATING APPARATUS
Filed March 25, 1944  2 Sheets-Sheet 2
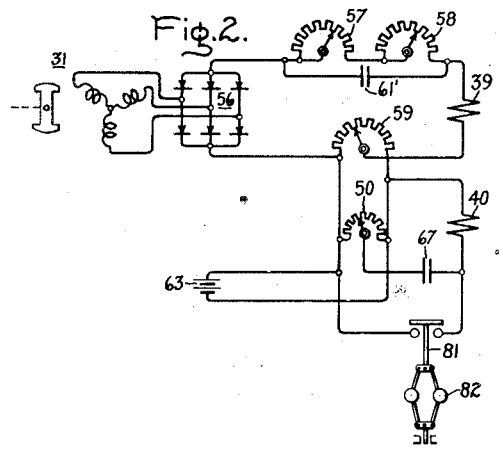
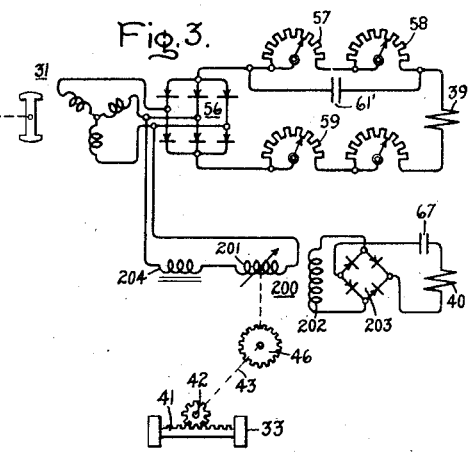
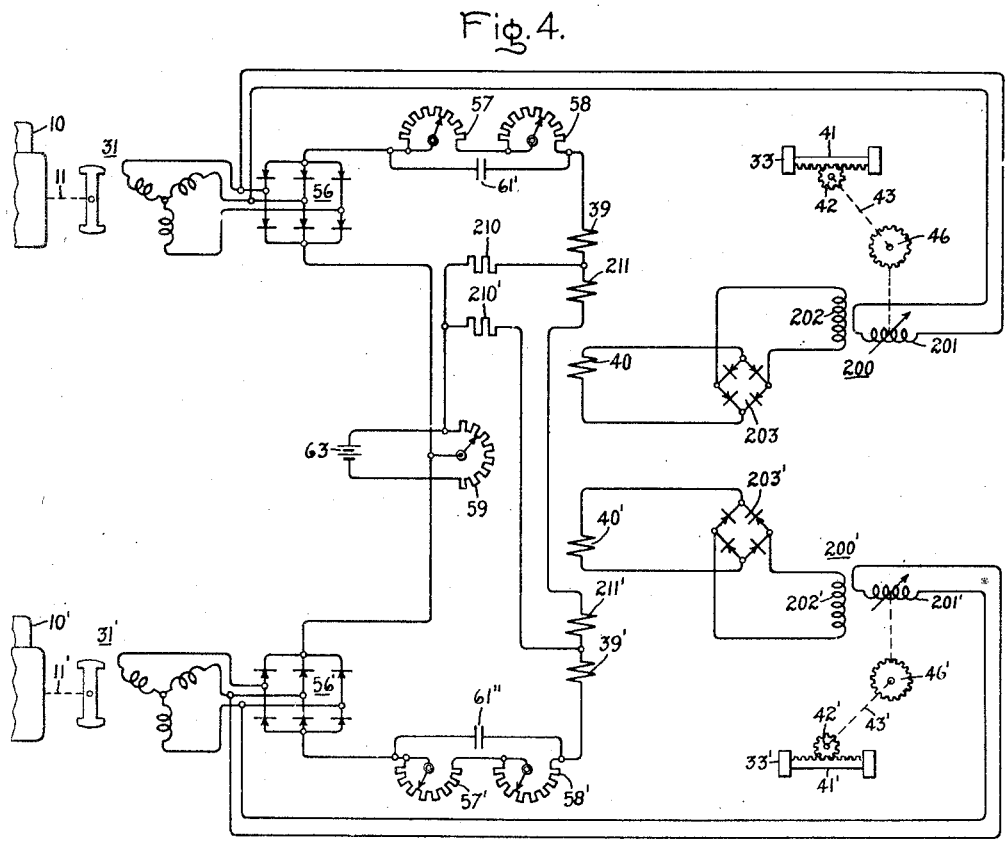
Inventor:
Martin A. Edwards,
by Harry E. Dunham
His Attorney.

Patented Dec. 4, 1945

2,390,084

UNITED STATES PATENT OFFICE 2,390,084

REGULATING APPARATUS

Martin A. Edwards, Scotia, N. Y., assignor to General Electric Company, a corporation of New York Application March 25, 1944, Serial No. 528,122

30 Claims. (Cl. 60—97)

My invention relates to regulating apparatus, and more particularly to speed responsive governing apparatus for prime movers, such as internal combustion engines, turbines, and the like. The invention is especially applicable to gas- or Diesel-electric power systems of the type commonly used in self-propelled vehicles.

Gas- or Diesel-electric power systems for locomotives or other self-propelled vehicles ordinarily comprise a prime mover, such as a Diesel or other internal combustion engine, arranged to drive a generator from which power is supplied to one or more traction motors. Such a system is inherently subject to great and sudden changes of power demand upon the prime mover as the load upon the traction motors is changed in accelerating, braking, coasting and reversing. Such varying conditions of operation, coupled with the fact that the electrical system of such a vehicle has approximately the same power capacity as the prime mover, makes it particularly easy and, at the same time, particularly dangerous to overload or underload the engine. A need has long been recognized for an improved engine governing system and apparatus for maintaining the engine speed substantially constant under such conditions of widely and rapidly varying engine load.

Accordingly, it is a general object of my invention to provide a new and improved prime mover governing apparatus capable of quickly following large and rapid changes of prime mover load.

It is a further object of my invention to provide new and improved means for stabilizing the operation of a prime mover governing apparatus thereby to prevent overshooting of the control point and consequent hunting of the apparatus.

I have illustrated my invention herein by way of example as applied to a gas-electric vehicle propulsion system. The governing apparatus of my present invention has been found entirely satisfactory in vehicle propulsion systems of this type.

My invention itself will be more fully understood and its objects and advantages further appreciated by referring now to the following detailed specification taken in conjunction with the accompanying drawings in which Fig. 1 is a schematic circuit diagram of connections for an electric power system embodying my invention and Figs. 2, 3, and 4 are simplified schematic circuit diagrams of various modifications of the engine governing apparatus shown at Fig. 1.

Referring now to the drawings and particularly to Fig. 1, the vehicle power system illustrated comprises a prime mover 10 of the internal combustion engine type arranged to drive, through a common shaft 11, a main generator 12 and a generator exciter 13. An output circuit for the armature 12a of the generator 12 is completed through the armatures and field windings of a pair of electric traction motors 16 and 17. The output circuit of the generator 12 includes a line switch 22 which may, if desired, be actuated by any suitable electromagnetic control system. It will be understood of course that the representation of a pair of traction motors 16 and 17 is purely diagrammatic, and that each motor shown on the drawings may represent either a single motor or a group of motors arranged either in series or parallel circuit relation.

It is well understood that in an internal combustion engine of the type herein contemplated the available horsepower output is a function of the speed. Thus, with the engine speed maintained substantially constant by a governer, the available engine horsepower at full throttle is substantially fixed, while the actual delivered horsepower may be smaller, as determined by the traction motor load and throttle position. As shown on the drawings, the engine 10 is provided with a multiple compartment carburetor having a plurality of fixed idling jets in a compartment 25 and a plurality of variable running jets in a compartment 25a. The running jets are supplied through a fuel inlet conduit 23 and controlled by a throttle valve having an operating lever 26. The idling jets are supplied through a separate fuel inlet conduit 23a provided with a shut-off valve 24 biased to a normally open position. The throttle lever 26 is biased by a tension spring 27 to an idling position with the throttle valve completely closed, and is connected through a rod 28 and an overtravel mechanism 29 to a fluid pressure governor servo-motor 30. The servo-motor 30 is controlled by a speed responsive apparatus including an engine-driven tachometer generator 31 and a foot pedal 32. The foot pedal 32 determines the speed setting of the speed responsive apparatus, and that apparatus controls the servo-motor 30 to maintain substantially constant the speed of the engine 10 at the desired setting. The pedal 32 is biased by a tension spring 32a to a released position such that the governor is set for idling speed.

The servo-motor 30 comprises a reversible fluid pressure motor 30a and a fluid control valve 30b. The fluid motor 30a includes a reciprocable power piston 33 and is connected by suitable inlet and outlet conduits to the control valve 30b. The control valve 30b includes a piston valve 34 formed to provide three spaced valve members 35, 36, and 37 and biased upwardly by a compression spring 34a. The piston valve 34 is connected for downward actuation against its bias by a solenoid 38 having a main actuating winding 39 and a stabilizing winding 40. The power piston 33 is arranged to move longitudinally a gear rack 41 which meshes with a pinion 42 mounted upon a governor shaft 43. Suitable fluid under pressure, such as oil, from the lubricating system (not shown) of the engine 10 is supplied to the servo-motor 30 through an inlet conduit 44 and is expelled from the motor 30 through an outlet conduit 45.

The governor shaft 43 is arranged to drive, through suitable gearing 46, 47, 48, a pair of potentiometers 49 and 50. The purpose of these potentiometers will be more fully described hereinafter. The shaft 43 also has rigidly mounted thereon an arm 51 which is resiliently connected, as by a tension spring 52, to a second arm 53 loosely mounted upon the shaft 43. The throttle rod 28 is connected to the loosely mounted arm 53. The arm 53, and hence the engine throttle lever 26, is movable between predetermined limits fixed by an idling stop 54 and a full throttle stop 55. The arm 51, which is fixedly attached to the governor shaft 43, is not limited in its movement by the full throttle stop 55 and is thus capable of a certain degree of overtravel beyond the full throttle position of the shaft 43. During such overtravel, the spring 52 between the arms 51 and 53 is stretched and the potentiometers 49 and 50 continue to move with the shaft 43. The potentiometer 49 is provided with a "dead" section over which it effects no change of potential of its slider 49a. The slider 49a operates over the dead section throughout the entire range of throttle controlling movement of the governor shaft 43, and over the live section of the potentiometer only during overtravel of the governor shaft 43 with respect to the throttle arm 53.

The principal control of the governor mechanism is through the engine tachometer generator 31 and the servomotor control winding 39, the tachometer generator being connected to resupply to the winding 39 a voltage proportional to the speed of the engine 10. The tachometer generator 31 has been shown as a three-phase magneto generator supplying current to a three-phase full wave rectifier 56 and from the rectifier 56 to the actuating winding 39 through a plurality of rheostats 57, 58, and 59 in series circuit relation. The rheostat 59 is controlled by the foot pedal 32 selectably to determine the speed setting of the governing apparatus at the will of an operator. To provide a maximum speed adjustment, a fourth rheostat 60 is connected across the output terminals of the rectifier 56. A condenser 61 is connected in parallel circuit relation with the rheostats 57, 58, and 59 for the purpose of controlling the energization of the actuating winding 39 in response to the rates of change of engine speed and foot pedal position. The condenser 61 serves to delay the effective change in foot pedal position upon the governor solenoid 38 and to increase the rapidity with which the solenoid 38 responds to changes in engine speed. The rheostat 57 determines minimum running speed and is arranged to be shunted by the normally closed contacts of a "dead man" switch 62. This switch is normally closed and is manually opened by the operator after the engine 10 is running and before the vehicle is set in motion. Thus the rheostat 58 controls the engine idling speed and the rheostat 57 controls the minimum running speed. The purpose of such minimum running engine speed is to provide adequate power for braking and steering even though the pedal 32 is in its released position.

The stabilizing winding 40 operates in conjunction with the actuating winding 39 to control the servomotor 30 and is connected through a capacitor 67 and a resistor 67a between one terminal and the sliding contact of the potentiometer 50 geared to the governor shaft 43. This potentiometer is connected at one terminal to ground and at the other terminal to the positive side of a suitable source of unidirectional current supply, such as a battery 63. The battery 63 is connected through a suitable disconnecting switch 64 to a wire B+, and the potentiometer 50 is connected to the wire B+ through a manually operable control switch 66. The condenser 67 in the circuit of the stabilizing winding 40 renders the winding 40 responsive only to changes in the setting of the potentiometer 50 produced by movements of the fluid-pressure power piston 33. The stabilizing current thus produced is proportional in amplitude to the speed of movement of the power piston 33. The stabilizing winding 40 is so arranged that it transiently opposes any movement of the fluid control piston valve 34 in response to change in the energization of the actuating winding 39. The winding 40, therefore, opposes overshooting and minimizes hunting of the governor.

The stabilizing winding 40 is shunted by a nonlinear unilateral conducting device, such as a rectifier 68. The break-down voltage of the rectifier 68 in its conducting direction is such that it does not provide appreciable shunting of the winding 40 for normal stabilizing currents in either direction. However, in the event that the engine load is dropped very suddenly, as due to a break in the line circuit, a very large transient current would tend to pass through the winding 40 in a direction to oppose the rapidly increasing flux of the winding 39. Under such conditions the winding 39 is attempting to reduce the engine speed. It is of course desirable to reduce the engine speed as rapidly as possible when the engine speed is thus increasing rapidly. It is therefore desirable at such time to do away with the opposing tendency of the winding 40. The rectifier 68 functions upon very rapid increase in engine speed to shunt the winding 40 thereby to eliminate its normal stabilizing effect.

To provide for starting and stopping the internal combustion engine 10, I provide a pair of manually operable push buttons 70 and 71 and an engine starting motor 69 connected to the engine shaft 11 to drive the engine. The push button 71 is for engine starting and comprises two normally open contacts 72 and 73. When the starting button 71 is depressed, the contact 72 completes an energizing circuit for an actuating winding 74 of a starting contactor 75. This energizing circuit may be traced from the wire B+ through the manual switch 66, the contact 72, and the actuating winding 74 to ground. When the starting contactor 75 picks up, it closes its contact 76 to complete an energizing circuit from the wire B+ through the engine starting motor 69.

During starting operation the starting switch 71 also closes its contact 73 to connect the stabilizing winding 40 of the governor momentarily directly across the battery 23. It will be noted that, with the engine at standstill, the engine lubricating oil in the conduit 44 is under zero pressure, the piston valve 34 is held at the upper limit of its movement by the spring 34a, and the engine throttle lever 26, the governor shaft 43 and the power piston 33 are held in their idling positions by the spring 27. Momentary energization of the winding 40 from the battery during engine cranking forces the piston valve 34 of the servo-motor 30 downward against the bias of the spring 34a thereby to ensure that the power piston 33 and the throttle control mechanism connected thereto remain in their idling positions. Were it not for this downward actuation of the piston valve 34, the pressure built up in the lubricating oil system by engine cranking would supply oil under pressure between the control valves 36 and 37 and thus to the right side of the power piston 33 thereby to move the piston 33 to its extreme left-hand position and the throttle lever 26 to its full open position. It is undesirable to attempt to start the engine with the throttle fully open and, in fact, many engines will not start with the throttle so positioned. It is to prevent such opening of the throttle before the engine 10 fires that the stabilizing winding 40 is momentarily energized from the battery. When the piston valve 34 is moved to its lowermost position by the coil 40, any oil under pressure in the conduit 44 is supplied to the left side of the power piston 33 and holds the throttle control mechanism in its idling position shown.

The engine stop switch 70 comprises two normally open contacts 77 and 78 and is arranged, when depressed, to complete through the contact 77 a circuit from the wire B+ through an actuating winding 79 of a fuel cutoff solenoid 80. As indicated upon the drawings, the solenoid 80 is arranged when energized to close the fuel cutoff valve 24 in the engine fuel conduit 23a. The other normally open contact 78 on the engine stop switch 70 is arranged to connect the governor stabilizing winding 40 directly across the battery in the same manner as the contact 73 of the engine starting switch 71. The reason for energizing the winding 40 from the engine stop switch 70 is to ensure that the piston valve 34 of the servo-motor 30 will be moved to its lowermost position thereby to move the power piston 33 to its idling position as the engine is brought to standstill. Thus, the contact 77 of the stop switch 70 controls the shutoff valve 24 to cut off fuel from the idling jets in the carburetor compartment 25, while the contact 78 controls the governor servo-motor 30 to move the throttle lever 26 to its idling position thereby to close the carburetor running jets in the compartment 25a. With the engine at standstill, of course, the engine throttle lever 26, the governor arms 51 and 53, the governor shaft 43, and the power piston 33 are all biased to their idling positions by the throttle spring 27, and the piston valve 34 of the servo-motor 30 is biased to its uppermost position by the compression spring 34a. When the engine is at standstill the lubricating oil pressure is zero, so that the power piston 33 is not moved to the left even though the valve member 36 is positioned for such movement.

The engine 10 is provided also with an overspeed switch 81 actuated by a suitable speed responsive mechanism 82. The switch 81 comprises a normally open contact 84 which is connected in parallel circuit relation with the engine stop switch contact 78 and a second normally open contact 85 connected in parallel circuit relation with the stop switch contact 77. Thus, when the engine tends to exceed a predetermined maximum speed, the overspeed contacts 84 and 85 act to stop the engine in the same manner as the stop switch 70. In so doing the overspeed contact 85 energizes the cutoff solenoid 80 to cut off fuel from the idling jets and the contact 84 energizes the stabilizing winding 40 from the battery to close the engine throttle. It will be understood that in operation the overspeed switch 81 is set for a speed considerably higher than normal so that it operates only as an emergency measure to prevent engine runaway. If desired the overspeed contact 85 controlling the cutoff solenoid 80 may be omitted. In such case the switch 81 will not stop the engine but will regulate or operate intermittently to energize the governor coil 40 thereby to maintain an average maximum engine speed.

The various parts of the governor mechanism are shown at Fig. 1 in their normal positions with the engine at standstill. The manner in which the engine is cranked and the piston valve 34 of the servo-motor 30 simultaneously and momentarily forced to its lowermost position has already been described. As soon as the engine fires, the starting switch 71 is released. Steady state energization of the stabilizing winding 40 from the battery is discontinued by opening of the switch 71 and the control piston 34 moves back from its lowermost position to an equilibrium position. This position of equilibrium is that in which the force of the spring 34a is just balanced by the opposing force of the main governor actuating winding 39. The force exerted by the winding 39 is dependent upon the engine speed, and the engine speed will now assume a value such that the opposing forces of the coil 39 and the spring 34a are balanced when the control valve member 36 is centrally positioned with respect to the oil inlet conduit 44. In this mid-position of the piston valve 34, oil under pressure is supplied in equal quantities to both sides of the valve member 36 by reason of the fact that the oil inlet conduit 44 is slightly larger than the valve member 36 so that the valve 36 is unable fully to block the oil inlet conduit. Therefore, oil in equal quantities is also supplied to both sides of the power piston 33. The oil thus supplied to both sides of the power piston and piston valve effects a hydraulic balancing of both members without giving rise to any tendency for either member to move in either direction. The continuous leakage of oil past the control valve 36 ensures quick response to any controlling movement of the piston valve 34.

It will now be evident that the servo-motor 30 will regulate to maintain the engine speed at a desired value. For example, if the engine speed increases for any reason, the energization of the governor actuating winding 39 will be increased and the piston valve 34 will be moved downward. Downward movement of the piston valve 34 closes the fluid connection from the inlet conduit 44 to the right-hand side of the power piston 33 and increases the flow of oil from the conduit 44 to the left side of the piston 33 thereby to move the piston 33 to the right and the engine throttle lever 26 toward its idling position. In moving downward, the control valve member 37 uncovers the associated exhaust port to permit exhaust of oil from the right side of the piston 33 to the exhaust port 45 as the piston moves toward the right. If, on the other hand, the engine speed decreases below its desired value for any reason, the energization of the governor winding 39 will decrease so that the spring 34a will move the piston valve 34 upward. When the piston valve 34 moves upward, the control valve 36 closes the fluid connection from the inlet conduit 44 to the left side of the piston 33 and admits more oil to the right side of the piston 33 thereby to move the power piston to the left. Simultaneously, the control valve member 35 uncovers the associated exhaust port to admit oil from the left end of the piston 33 to the exhaust conduit 45. Movement of the power piston 33 toward the left moves the engine throttle lever 26 toward its full open position thereby to increase the engine speed.

The constant engine speed maintained by the governor mechanism is determined by the rheostats 57, 58, 59, and 60. The rheostats 57 and 58 are set manually to determine the amount of resistance in series with the governor coil 39 with the pedal 32 in its released position. The pedal controlled rheostat 59 is also connected in series circuit relation with the winding 39 and permits selection of the engine speed by the pedal 32 at the will of the operator. The released position of the pedal 32, as determined by the spring 32a is such that the rheostat 59 inserts its minimum resistance in the circuit of the winding 39. As the pedal 32 is depressed, the rheostat 59 inserts more resistance in series with the winding 39. Since the current in the winding 39 must be the same at any speed maintained in order that the piston valve 34 will be balanced in its mid-position, the engine speed and hence the voltage of the tachometer generator 31 increases as the pedal 32 is depressed. The rheostat 60 is set manually to determine the engine speed at the maximum speed position of the rheostat 59. This rheostat 60, being connected across the tachometer in parallel circuit relation with the winding 39 and the rheostats 57, 58, and 59, determines the proportion of current passing through the winding 39, and hence may be set to require various engine speeds in order to pass the necessary fixed current through the winding at the maximum resistance position of the rheostat 59.

The purpose of the overtravel linkage 29 will now be evident. If the load upon the engine 10 is so great that even after the governor has moved the throttle lever 26 to its full open position the engine is still unable to maintain the desired speed, the governor, through the overtravel linkage 29 connected to the governor shaft 43, will move the slider of the potentiometer 49 over the "live" section of the potentiometer without effecting further movement of the engine throttle. Movement of the potentiometer slider 49a in overtravel over the "live" section of the potentiometer 49 reduces the excitation of the generator exciter 13, and hence the generator 12, in a manner which will be more fully described hereinafter. Such reduction of the generator excitation reduces the load upon the engine and permits the engine to attain the desired speed. By this arrangement the power demand of the engine driven generator 12 is reduced in the middle range of its volt-ampere characteristic, where it would otherwise exceed the maximum available horsepower output of the engine 10, thereby to prevent slight engine stalling within this range and permit maximum utilization of the full available engine horsepower over a wide range of vehicle speed and generator load current.

The electric traction motor control system forming part of the complete power system illustrated at Fig. 1 is shown only in broad outline.

The main engine driven generator 12 is provided with a main field exciting winding 90 connected directly to the terminals of the dynamoelectric exciter 13 and so controlled as to provide in the output circuit of the generator 12 a continuing unidirectional flow of current having a controlled maximum or limiting value substantially independent of the back electromotive force of the traction motors 16 and 17. The volt-ampere characteristic of the generator 12 at any predetermined engine speed is dependent upon the energization of the main generator field exciting winding 90 which is, in turn, controlled by the energization of a plurality of field windings 91, 92 and 94 on the exciter 13.

Preferably, the exciter 13 is a direct current generator of the type described and claimed in Patent 2,227,992 issued to Ernst F. W. Alexanderson and Martin A. Edwards on January 7, 1941. Such a generator is of the cross armature reaction excited, direct armature reaction compensated type, known as an amplidyne, and is provided with a pair of current supply brushes 95 and a pair of short-circuited brushes 96. The control field winding 94 is arranged to generate a voltage between the short-circuited brushes 96 and the cross armature reaction of the current flowing through the short-circuited connection as a result of this voltage sets up a flux in such a direction as to provide an output voltage at the load brushes 95 which is proportional to the excitation of the machine along its short-circuit axis. The field winding 92 is a series load compensating winding for neutralizing the armature reaction of the exciter load current. One of the desirable characteristics of an amplidyne generator of this type is that its output voltage responds very rapidly and with a high degree of amplification to any change in the energization of its control field windings.

The generator exciter main control field winding 94 is energized from the battery 63 through the governor potentiometer 49. It will be observed that the potentiometer 49 is connected to the wire B+ through a resistor 100 and to ground through a resistor 99 and a manual control switch 102. The control field winding 94 is connected in series with a resistor 101 between the grounded side of the resistor 99 and the slider 49a of the potentiometer 49. It will be understood of course that the resistors 99 and 101 are grounded through the control switch 102 only when the switch 102 is in its closed running position.

In connection with the above description of the energization of the control field winding 94, it will be borne in mind that the battery energization of this field winding is maintained constant by the potentiometer 49 over the full range of engine throttle variation. The battery energization of the winding 94 is reduced by the potentiometer, thereby to reduce the main generator excitation and output voltage, only when the load upon the engine is such that the desired speed cannot be maintained even with the throttle fully open. This field reducing action of the governor controlled potentiometer 49 takes place only during overtravel operation of the governor and is of a regulatory nature, so that the power demand of the generator is maintained substantially equal to the available power output of the engine.

In view of the foregoing detailed explanation of the various parts of the power system of Fig. 1 and the manner of their connection and mode of operation, the operation of the system as a whole will be readily understood from the following brief description.

Assuming first that the vehicle is at standstill and that the engine is not running, the engine may be set in operation by closing the switches 64 and 66 and the engine starting switch 71. The manner in which the switch 71 starts the engine by energizing the starting motor 69 and simultaneously moving the governor piston valve 34 to maintain the governor power piston 33 in its idling position has already been described. Motoring operation is now initiated by closing the line switch 22 to complete the motor circuit, closing the switch 102 to connect the potentiometer 49 across the battery 63 thereby to complete an energizing circuit for the main control field winding 94 of the generator exciter 13, and opening the switch 62 to unshunt the governor rheostat 57. It will be understood that in practice the switches 22, 102 and 62 may be controlled by a suitable manual sequence controller of any well known type. With the generator 12 excited, current flows in the motor circuit and the vehicle begins to accelerate from standstill in the forward direction.

If it is desired to increase the speed of the vehicle, the accelerator pedal 32 is depressed to increase the resistance interposed by the rheostat 59 in the circuit of the governor actuating winding 39. The consequent decrease in the energization of the winding 39 causes the governor piston valve 34 to move upward to supply oil to the right side of the power piston 33 and thereby to open the engine throttle. During throttle opening movement, the governor potentiometer 50 is changing the potential impressed upon the condenser 67, thereby to produce in the governor stabilizing winding 40 a transient current having a magnitude proportional to the speed of the power piston 33 and in a direction tending to oppose the upward movement of the governor piston valve 34. This opposing action of the stabilizing winding 40 is effective only so long as the governor power piston 33 is in motion. When the engine 10 attains such a speed that the predetermined normal current is again established through the governor actuating winding 39, the governor piston valve 34 again assumes its normal mid-position and, by regulating action, maintains the engine speed at the new value.

The action of the rectifier 68 in shunting the governor stabilizing winding 40 to prevent engine runaway has already been described.

In order to stop the engine, the push button 70 is depressed to complete an energizing circuit for the shut-off solenoid 80 and momentarily to energize the governor stabilizing winding 40 from the battery. As previously described, the shut-off solenoid 80 actuates the valve 24 to shut off the fuel supply from the carburetor idling jets, while the battery energization of the governor stabilizing winding 40 forcibly drives the piston valve 34 downward thereby to move the power piston 33 to its idling position and ensure closing of the carburetor running jets. After the engine 10 has come to standstill, the governor power piston 33 and other parts of the throttle linkage are held in their idling positions by the throttle spring 27 and the governor piston valve 34 is held in its uppermost position by the spring 34a.

In view of the foregoing explanation of my invention as embodied in the power system of Fig. 1, the modified forms of the invention illustrated at Figs. 2–4, inclusive, will be readily understood. In these latter figures, I have illustrated various control circuit arrangements for the governor actuating and stabilizing windings 39 and 40, respectively. While their arrangement is different, the various elements of the circuits of Figs. 2, 3, and 4 correspond to similar elements of Fig. 1, and like parts have been assigned the same reference numerals.

At Fig. 2, I have shown an embodiment of my invention in which the voltage of the tachometer generator 31 is balanced against a selectable portion of an opposing voltage derived from the battery 63. In this case, the rheostat 59 is connected as a potentiometer across the battery 63 and the series circuit through the governor actuating winding 39 is connected to the potentiometer slider to include in the circuit a desired portion of the battery voltage in opposing relation to the voltage of the tachometer generator 31. At Fig. 2, the governor rheostat 50 is connected across the battery 63 and to the governor stabilizing winding 40 through the capacitor 67 in the same manner as shown in Fig. 1.

At Fig. 2, I have shown a condenser 61' connected across only the control rheostats 57 and 58 in place of the condenser 61 of Fig. 1 connected across these rheostats and also the rheostat 59. With the connection of condenser 61' shown at Fig. 2, this condenser has no effect upon the rapidity with which changes in foot-pedal position are felt by the actuating winding 39, but functions only under changing speed conditions to prevent hunting of the governor by accelerating the effect of tachometer voltage changes upon the governor actuating winding 39.

At Fig. 3, I have shown an embodiment of my invention in which the unidirectional current supply for the stabilizing winding 40 of the governor is derived from the tachometer generator 31 and introduced into the stabilizing winding through a variable coupling transformer 200, thereby rendering the governor independent of outside power sources. The variable coupling transformer 200 comprises a movable primary winding 201 and a stationary secondary winding 202. The primary winding 201 is connected for movement by the power piston 33 of the governor and the secondary winding 202 is connected through a suitable full wave rectifier 203 and the condenser 67 to the stabilizing winding 40 of the governor. The primary winding 201 of the transformer is energized through a fixed reactance 204 from one phase of the alternating current output of the tachometer generator 31, so that the transformer primary current is substantially constant at any predetermined engine speed regardless of the slight speed variations effecting regulating operation of the governor. Therefore, for any predetermined speed setting of the governor, the secondary voltage of the variable coupling transformer 200 is independent of engine speed and is dependent only upon the degree of coupling as controlled by the power piston 33. It will now be evident that movement of the power piston 33 in governor operation effects a change in charge of the condenser 67 and causes a transient flow of current through the governor stabilizing winding 40 to oppose the controlling movement of the piston valve 34 in a manner similar to that heretofore described in connection with Figs. 1 and 2.

At Fig. 4, I have shown an embodiment of my invention arranged to facilitate the operation of two prime movers in parallel load relation. According to this embodiment of the invention, each of the prime movers is provided with a governor structurally similar to that shown at Fig. 1 and electrically connected to incorporate features of both Figs. 2 and 3. The parts of the governor associated with the engine 10 have been assigned reference numerals the same as those at Fig. 3, and the parts of the governor associated with a second engine 10' have been assigned like reference numerals similarly distinguished.

At Fig. 4, the circuit for each of the governor actuating windings 39 and 39' is connected in the manner of that shown at Fig. 2 to include, in opposing relation to the tachometer generator, a selectable portion of the unidirectional battery voltage appearing across the rheostat 59 connected as a potentiometer. The circuit of the governor winding 39 also includes a series resistor 210 and the circuit of the governor actuating winding 39' includes a series resistor 210'. Specifically, the energizing circuit for the governor actuating winding 39 may be traced from the positive terminal of the rectifier 56 through the upper portion of the potentiometer 59, the resistor 210, the actuating winding 39, and the rheostats 57 and 58 to the negative terminal of the rectifier 56. The energizing circuit for the governor actuating winding 39' may be similarly traced from the rectifier 56'.

The stabilizing windings 40 and 40' of Fig. 4 are each energized through a variable coupling transformer and a rectifier bridge in the manner heretofore described in connection with Fig. 3. The variable coupling transformer 200 is controlled by the governor associated with the engine 10, and the variable transformer 200' is controlled by the governor associated with the engine 10'.

In order that the engines 10 and 10' shall share the load equally or proportionately, each engine governor is provided with an additional or paralleling winding connected for response to the difference of the currents flowing in the circuits of the governor actuating windings 39 and 39'. Specifically, there is associated with the governor actuating winding 39 a paralleling winding 211 and with the governor actuating winding 39' a paralleling winding 211'. The paralleling windings 211 and 211' are connected in series circuit relation and to measure the difference in voltage drops across the resistors 210 and 210'.

In operation, it will be understood that, with both the engines 10 and 10' operating exactly at the desired speed, the currents in the circuits of the governor actuating windings 39 and 39' are equal, so that no current flows through the paralleling coils 211 and 211'. If now the load upon one engine, for example the engine 10, is decreased so that the engine 10 speeds up, the current through the governor actuating winding 39 and the resistor 210 increases. The increased current through the winding 39 actuates the governor of the engine 10 to close the engine throttle. At the same time, the increased voltage drop across the resistor 210 causes a flow of differential current through the paralleling windings 211 and 211' in a direction tending to oppose closing of the throttle of the engine 10 and to assist closing of the throttle of the engine 10'. In this manner, each engine is prevented from dropping its load and transferring the entire load to the other engine upon the slightest irregularity of operation. The operation is reversed if the engine 10 is reduced in speed by increased load.

In all the embodiments of my invention described above, I have utilized a three-phase alternating current tachometer generator in connection with a three-phase rectifier for obtaining a unidirectional voltage proportional to engine speed. It will be understood by those skilled in the art that with such an arrangement a certain amount of alternating or ripple voltage appears in the direct current output continuously traversing the governor actuating winding 39. I have found that this ripple current is highly desirable by reason of the fact that it produces a very slight but continuous oscillation of the governor piston valve 34 about a mean control position determined by the magnitude of the direct current component in the coil 39. With the piston valve 34 thus kept in continuous motion, the friction of the piston in its cylinder is considerably reduced. The same effect may, if desired, be produced by a separate coil on the solenoid 38 energized from the alternating current output of the tachometer 31.

While I have shown and described only certain preferred embodiments of my invention by way of illustration, many modifications will occur to those skilled in the art and I therefore wish to have it understood that I intend in the appended claims to cover all such modifications as fall within the true spirit and scope of my invention.

What I claim as new and desire to secure by Letters Patent of the United States is:

1. In a regulating apparatus for a prime mover having a throttle valve, a fluid pressure motor connected to actuate said throttle valve, a movable fluid control valve responsive to the speed of said prime mover for controlling said fluid motor, and means transiently responsive to movement of said fluid motor for transiently opposing movement of said control valve.

2. In a regulating apparatus for a prime mover having a throttle valve, a fluid pressure motor connected to actuate said throttle valve, a movable fluid control valve responsive to the speed of said prime mover for effecting operation of said fluid motor at a speed proportional to displacement of the speed of said prime mover from a predetermined desired speed, and means responsive to the speed of said fluid motor for transiently and proportionately opposing controlling movement of said control valve.

3. In a regulating apparatus for a prime mover having a throttle valve, a fluid pressure motor connected to actuate said throttle valve, a movable fluid control valve for effecting operation of said fluid motor, electromagnetic means responsive to the speed of said prime mover for actuating said control valve, and means responsive to the speed of said fluid pressure motor proportionately to oppose the controlling action of said electromagnetic means.

4. In a regulating apparatus for a prime mover having a throttle valve, a reversible fluid pressure motor connected to actuate said throttle valve thereby to control the speed of said prime mover, a fluid control valve movable to either side of normally balanced mid-position to effect operation of said motor in opposite directions, electromagnetic means responsive to the speed of said prime mover for controlling said control valve, and electromagnetic means responsive to movement of said fluid motor in either direction to oppose controlling movement of said control valve.

5. In a regulating apparatus for a prime mover having a throttle valve, a reversible fluid pressure motor connected to actuate said throttle valve thereby to control the speed of said prime mover, a fluid control valve movable to either side of a normally balanced mid-position to effect operation of said motor in opposite directions, means for biasing said control valve in one direction, electromagnetic means responsive to the speed of said prime mover for moving said control valve in the opposite direction, and electromagnetic means responsive to movement of said fluid motor in either direction to oppose the controlling action of said speed responsive electromagnetic means.

6. In a regulating apparatus for a prime mover having a throttle valve, a reversible fluid pressure motor connected to actuate said throttle valve thereby to control the speed of said prime mover, a fluid control valve movable to either side of the mid-position to effect operation of said motor in opposite directions, means for biasing said control valve in one direction, an electromagnet having an actuating winding energized in accordance with the speed of said prime mover for moving said control valve in the opposite direction, said electromagnet normally holding said control valve balanced in said mid-position when the speed of said prime mover is at a predetermined desired value, a stabilizing winding associated with said electromagnet, means for energizing said stabilizing winding including a source of direct current supply and a blocking condenser, and means responsive to movement of said fluid motor in either direction for changing the voltage of said direct current supply source in a sense to energize said stabilizing winding to oppose the controlling influence of said actuating winding.

7. In a regulating apparatus for a prime mover having a throttle valve, a reversible fluid pressure motor connected to actuate said throttle valve, a fluid control valve, means including an electromagnet energized in accordance with the speed of said prime mover for regulating said control valve about a normally balanced mid-position to effect operation of said fluid motor at a speed proportional to the deviation of said prime mover from a predetermined speed, said fluid motor being maintained at standstill when said control valve is in said mid-position, electromagnetic stabilizing means associated with said electromagnet, and means including a source of electric current supply responsive to movement of said fluid motor transiently to energize said stabilizing means in accordance with the speed of said fluid motor in either direction and in a sense always to oppose controlling movement of said control valve.

8. In a regulating apparatus for a prime mover having a throttle valve to control the speed thereof, a fluid pressure motor connected to actuate said throttle valve, an electromagnetic fluid control valve movable to effect operation of said fluid motor, an alternating current tachometer generator driven by said prime mover and connected to energize said electromagnetic valve, and electromagnetic means associated with said alternating current generator continuously to oscillate said control valve at relatively high frequency without appreciably affecting the supply of fluid to said prime mover.

9. In a regulating apparatus for a prime mover having a throttle valve to control the speed thereof, a fluid pressure motor connected to actuate said throttle valve, an electromagnetic fluid control valve movable to effect operation of said fluid motor, means for supplying to said electromagnet an energizing current having a direct current component proportional to the speed of said prime mover and an appreciable alternating current component, said alternating current component being effective continuously to oscillate said control valve about a mean controlling position without significantly affecting the supply of fluid to said fluid motor thereby to minimize friction in said control valve.

10. In a regulating apparatus for a prime mover having a throttle valve, a reversible fluid pressure motor connected to actuate said throttle valve thereby to control the speed of said prime mover, a fluid control valve movable to either side of a balanced midposition to supply fluid to said motor through alternative paths thereby to effect operation of said fluid motor in opposite directions, said control valve being arranged when in said midposition to supply fluid to said motor equally through both said alternative paths thereby hydraulically to balance said motor, means responsive to the speed of said prime mover for regulating said control valve about said midposition to maintain said speed substantially constant, and means transiently responsive to movement of said fluid motor in either direction transiently to oppose controlling movement of said control valve.

11. In a regulating apparatus for a prime mover having a throttle valve, a fluid pressure motor connected to actuate said throttle valve, a movable control valve responsive to the speed of said prime mover for controlling said fluid motor, stabilizing means responsive to the speed of said fluid motor transiently to oppose movement of said control valve, and means operable upon the occurrence of a predetermined high fluid motor speed to disable said stabilizing means.

12. In a regulating apparatus for a prime mover having a throttle valve, a fluid pressure motor connected to actuate said throttle valve, a movable control valve responsive to the speed of said prime mover for controlling said fluid motor to maintain said prime mover speed substantially constant at a desired value, stabilizing means responsive to the speed of said fluid motor transiently to oppose controlling movement of said valve, and means responsive to a predetermined deviation of said prime mover speed from said desired value for disabling said stabilizing means.

13. In a regulating apparatus for a prime mover having a throttle valve, a fluid pressure motor connected to actuate said throttle valve, a movable control valve responsive to the speed of said prime mover for controlling said fluid motor to maintain said prime mover speed substantially constant at a desired value, said fluid motor speed being proportional to the deviation of said prime mover speed from said desired value, stabilizing means responsive to the speed of said fluid motor transiently to oppose controlling movement of said valve, and non-linear means responsive to said fluid motor speed for disabling said stabilizing means upon the occurrence of a predetermined deviation of prime mover speed.

14. In a regulating apparatus for a prime mover having a throttle valve, a fluid pressure motor connected to actuate said throttle valve, a movable control valve responsive to the speed of said prime mover for effecting operation of said fluid motor at a speed proportional to displacement of the speed of said prime mover from a predetermined desired speed, stabilizing means responsive to the speed of said fluid motor for transiently opposing controlling movement of said control valve in proportion to the speed of said fluid motor, and means operable upon overspeeding of said fluid motor in response to rapid increase of speed of said prime mover to disable said stabilizing means and effect rapid throttling of said prime mover.

15. In a regulating apparatus for a prime mover having a throttle valve, a reversible fluid pressure motor connected to actuate said throttle valve thereby to control the speed of said prime mover, a fluid control valve movable to either side of a balanced mid-position to effect operation of said motor in opposite directions, electromagnetic means responsive to the speed of said prime mover for controlling said control valve to maintain the speed of said prime mover at a predetermined value, second electromagnetic means responsive to movement of said fluid motor in either direction to oppose controlling movement of said control valve, and non-linear unilateral conducting means connected to shunt said second electromagnetic means only upon predetermined increase of said prime mover speed above said predetermined value thereby to facilitate rapid closure of said throttle valve.

16. In a regulating apparatus for a prime mover having a throttle valve, a fluid pressure motor connected to actuate said throttle valve, a movable control valve responsive to the speed of said prime mover for controlling said fluid motor, stabilizing means responsive to the speed of said fluid motor transiently to oppose controlling movement of said throttle valve, and means responsive to excessive overspeeding of said prime mover for controlling said stabilizing means to aid closing movement of said throttle valve.

17. In a regulating apparatus for a prime mover having a throttle valve, a fluid pressure motor connected to actuate said throttle valve, a control valve for effecting operation of said fluid motor, electromagnetic means responsive to the speed of said prime mover for controlling said control valve to maintain the speed of said prime mover substantially constant, electromagnetic stabilizing means energized in response to movement of said fluid motor transiently to oppose controlling movement of said control valve, and means responsive to excessive overspeeding of said prime mover to energize said stabilizing means in a sense positively to aid closing movement of said throttle valve.

18. In a regulating apparatus for a prime mover having a throttle valve, a reversible fluid pressure motor connected to actuate said throttle valve, a fluid control valve movable to either side of a balanced mid-position to effect operation of said fluid motor in opposite directions, electromagnetic means responsive to the speed of said prime mover for controlling said throttle valve to maintain the speed of said prime mover substantially constant at a desired value, second electromagnetic means responsive to movement of said fluid motor in either direction transiently to oppose controlling movement of said control valve, and means responsive to a predetermined excessive overspeeding of said prime mover continuously to energize said second electromagnetic means in a sense to effect rapid throttling of said prime mover.

19. In a regulating apparatus for a prime mover having a throttle valve movable between idling and fully open positions, a reversible fluid pressure motor connected to actuate said throttle valve, a fluid control valve biased to a position to maintain said fluid motor in a position fully to open said throttle valve, electromagnetic means responsive to the speed of said prime mover for moving said control valve against its bias and effecting regulation of said valve about a balanced midposition, means for cranking said engine, and means operable in conjunction with said cranking means for forcibly moving said control valve against its bias to a position to maintain said throttle valve in said idling position.

20. In a regulating apparatus for a prime mover having a throttle valve movable between idling and fully open positions, a reversible fluid pressure motor connected to actuate said throttle valve, a fluid control valve biased to a position to maintain said fluid motor in position fully to open said throttle valve, means responsive to the speed of said prime mover for effecting regulation of said control valve about a normally balanced midposition, electromagnetic stabilizing means responsive to movement of said fluid motor to oppose controlling movement of said control valve, means for cranking said engine, and means operable in conjunction with said cranking means for energizing said stabilizing means from a separate source of constant electric current supply to move said control valve against its bias to a position to maintain said throttle valve in said idling position.

21. In a regulating apparatus for a prime mover having a throttle valve, a reversible fluid pressure motor connected to actuate said throttle valve, a fluid control valve biased to a position to maintain said fluid motor in position fully to open said throttle valve, electromagnetic means responsive to the speed of said prime mover for effecting regulation of said control valve about a normally balanced midposition, and means independent of said electromagnetic means for moving said control valve against its bias to a position to effect closing movement of said throttle valve for stopping said prime mover.

22. In a regulating apparatus for a prime mover having a throttle valve, a reversible fluid pressure motor connected to actuate said throttle valve, a fluid control valve biased to a position to maintain said fluid motor in position fully to open said throttle valve, electromagnetic means responsive to the speed of said prime mover for effecting regulation of said control valve about a balanced midposition, electromagnetic stabilizing means transiently responsive to movement of said fluid motor to oppose controlling movement of said control valve, and means for stopping said prime mover including a separate source of substantially constant electric current supply for continuously energizing said stabilizing means to move said control valve against its bias to a position to effect throttle closing operation of said fluid motor.

23. In a regulating apparatus for a prime mover having a throttle valve, a reversible fluid pressure motor connected to actuate said throttle valve, a source of fluid pressure supply responsive to operation of said prime mover, a fluid control valve biased to a position to maintain said fluid motor in position fully to open said throttle valve, means for biasing said throttle valve and said fluid motor to an idling position, electromagnetic means responsive to the speed of said prime mover for effecting regulation of said control valve about a balanced midposition to effect speed regulating operation of said fluid motor during running of said prime mover, electromagnetic stabilizing means for said control valve responsive to regulating movement of said fluid motor transiently to oppose controlling movement of said control valve, means for cranking said engine, means operable in conjunction with said cranking means for continuously energizing said stabilizing means independently of said fluid motor to move said control valve to a position to maintain said throttle valve in said idling position, and means for stopping said engine including additional means for continuously energizing said stabilizing means to move said throttle valve to said idling position.

24. In a governing system for a prime mover having a throttle valve, a fluid pressure motor connected to actuate said throttle valve, a fluid control valve biased for movement in one direction, means including an electromagnet having an actuating winding for moving said control valve against its bias and normally maintaining said control valve in a balanced midposition, means including a manually controllable variable resistor for energizing said actuating winding in accordance with the speed of said prime mover, and time element means associated with said resistor for controlling the energization of said actuating winding in accordance with rate of change of prime mover speed and resistance value.

25. In a governing system for a prime mover having a throttle valve, a fluid pressure motor connected to actuate said throttle valve, a fluid control valve biased for movement in one direction, means including an electromagnet having an actuating winding for moving said control valve against its bias and normally maintaining said control valve in a balanced mid-position, means for energizing said actuating winding in accordance with the speed of said prime mover, manually controllable resistance means in series circuit relation with said actuating winding for controlling the speed of said prime mover, and time element means associated with said energizing means and said resistance means transiently to delay the effect of resistance changes upon said actuating winding and to accelerate the effect of prime mover speed changes upon said accelerating winding thereby to prevent hunting of said governing system.

26. In a governing system for a prime mover having a throttle valve, a fluid pressure motor connected to actuate said throttle valve, a fluid control valve biased for movement in one direction, means including an electromagnet having an actuating winding for moving said control valve against its bias and normally maintaining said control valve in a balanced mid-position, means for energizing said actuating winding in accordance with the speed of said prime mover, manually controllable resistance means in series circuit relation with said actuating winding for controlling the speed of said prime mover, and a capacitive storage element connected in parallel circuit relation with said resistance means transiently to delay the effect of resistance changes and to accelerate the effect of prime mover speed changes upon said control valve.

27. In a governing system for a prime mover having a throttle valve, a fluid pressure motor connected to actuate said throttle valve, a fluid control valve biased for movement in one direction, means including an electromagnet having an actuating winding for moving said control valve against its bias and normally maintaining said control valve in a balanced mid position, a tachometer generator for energizing said actuating winding in accordance with the speed of said prime mover to effect regulation of said control valve about said mid-position thereby to maintain the speed of said prime mover substantially constant, manually controllable variable resistance means connected in series circuit relation with said actuating winding to select the governed speed of said prime mover, and second manually controllable variable resistance means connected in shunt circuit relation with said actuating winding to determine the maximum governed speed of said prime mover.

28. In a governing system for a plurality of prime movers connected to supply power in parallel load relation, a throttle valve associated with each of said prime movers, a fluid pressure motor connected to actuate each of said throttle valves, a movable fluid control valve associated with each of said fluid motors, means for biasing each of said control valves to effect operation of the associated fluid motor in one direction, electromagnetic means including an actuating winding for moving each of said control valves against its bias to effect operation of the associated fluid motor in the opposite direction, means for energizing each of said actuating windings in accordance with the speed of the prime mover associated therewith, said electromagnetic means holding each of said control valves in a balanced mid-position when the associated prime mover is running at a predetermined desired speed, and means for stabilizing the load distribution between said prime movers comprising electromagnetic means for simultaneously controlling all of said control valves in accordance with a difference in the amount of deviation of said prime movers from their predetermined desired speeds.

29. In a governing system for a plurality of prime movers connected to supply power in parallel load relation, a throttle valve associated with each of said prime movers, a fluid pressure motor connected to actuate each of said throttle valves, a movable fluid control valve associated with each of said fluid motors, means for biasing each of said control valves to effect operation of the associated fluid motor in one direction, electromagnetic means including an actuating winding for moving each of said control valves against its bias to effect operation of the associated fluid motor in the opposite direction, means for energizing each of said actuating windings in accordance with the speed of the prime mover associated therewith, said actuating windings carrying equal currents and holding the associated control valve in a balanced mid-position when the connected prime mover is running at a predetermined desired speed, and means responsive to a difference of the currents in said actuating windings for simultaneously controlling all of said control valves to stabilize the distribution of load upon the said prime movers.

30. In a governing system for a pair of prime movers connected to supply power in parallel load relation, a throttle valve associated with each of said prime movers, a fluid motor connected to actuate each of said throttle valves, a movable control valve associated with each of said fluid motors, means for biasing each of said control valves to effect operation of the associated fluid motor in one direction, electromagnetic means including an actuating winding for moving each of said control valves against its bias to effect operation of the associated fluid motor in the opposite direction, means for energizing each of said actuating windings in accordance with the speed of the associated prime mover, said actuating windings carrying equal currents and holding said control valves in balanced mid-positions when the associated prime movers are running at predetermined desired speeds, and means responsive to the difference of the currents in said actuating windings for opposing controlling action of either of said control valves in response to a speed change of the associated prime mover and simultaneously effecting controlling action of the other control valve in a like sense.

MARTIN A. EDWARDS.